United States Patent Office 3,709,899
Patented Jan. 9, 1973

---

3,709,899
6-PHENYL-4H-s-TRIAZOLO[4,3-a][1,4]BENZODI-AZEPINES AND THEIR PRODUCTION
Jackson B. Hester, Jr., Galesburg, Mich., assignor to The Upjohn Company, Kalamazoo, Mich.
No Drawing. Filed Apr. 28, 1971, Ser. No. 138,291
Int. Cl. C07d 57/02
U.S. Cl. 260—308 R    19 Claims

ABSTRACT OF THE DISCLOSURE 1-substituted - 6 - phenyl - 4H - s - triazolo[4,3-a][1,4] benzodiazepines of the Formula VI:

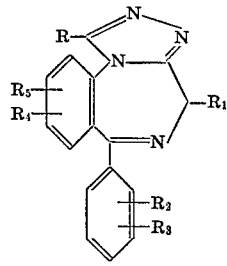

VI wherein R is selected from the group consisting of chlorine, bromine, cyano, OR' in which the alkyl group R' is of 1 to 3 carbon atoms, inclusive, and

in which R'' and R''' are alkyl groups defined as above or together

represent pyrrolidino, piperidino, and morpholino; wherein $R_1$ is selected from the group consisting of hydrogen and alkyl, as defined above; and wherein $R_2$, $R_3$, $R_4$, and $R_5$ are selected from the group consisting of hydrogen, alkyl, as defined above, dialkylamine, in which alkyl is defined as above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive, are produced by heating a 4H-s-triazolo[4,3-a][1,4]benzodiazepine:

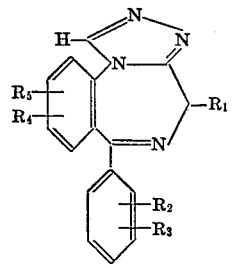

I wherein $R_1$, $R_2$, $R_3$, $R_4$, and $R_5$ are defined as above, with a N-halosuccinimide (chloro or bromo) to give the compound II (or VI in which R is chlorine or bromine). The compound IIa (R of VI is bromo) gives with cuprous cyanide the compound III (R=CN), with sodium alkoxide IV (R=OR' R' defined as above); and with a secondary amine the compound V

in which R'' and R''' are alkyl, defined as above or

are pyrrolidino, piperidino and morpholino.
The new products of Formula VI including their pharmacologically acceptable acid addition salts are useful as sedatives, transquillizers, and muscle relaxants in mammals and birds.

BACKGOUND OF THE INVENTION

Field of the invention

This invention is directed to new organic compounds and is particularly concerned with novel 1-substituted-6-phenyl - 4H - s - triazolo[4,3-a][1,4]benzodiazepines and a process for the production thereof.

The novel compounds and the process of production therefor can be illustratively represented as follows:

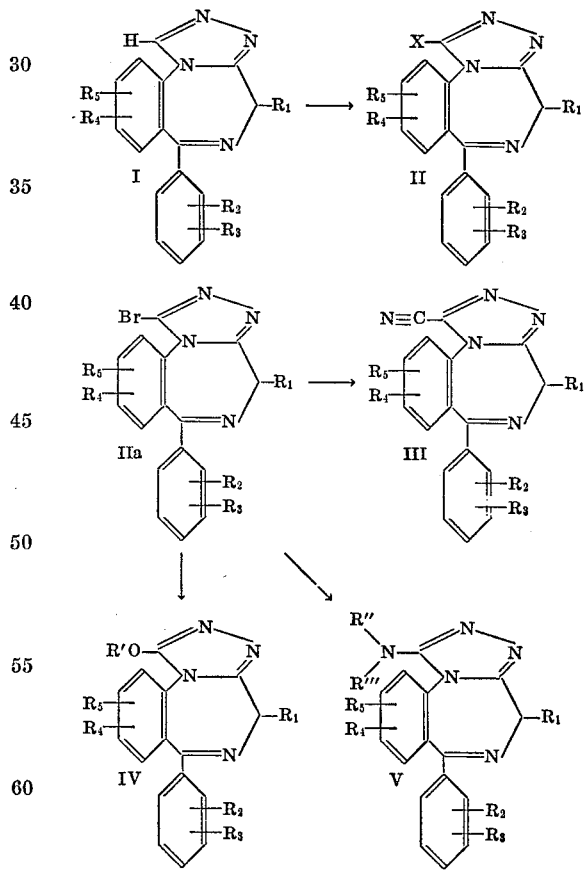

wherein R' is alkyl of 1 to 3 carbon atoms, inclusive, wherein $R_1$ is selected from the group consisting of hydrogen and alkyl of 1 to 3 carbon atoms, inclusive; wherein $R_2$, $R_3$, $R_4$, and $R_5$ are selected from the group consisting of hydrogen, alkyl, as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive; wherein X is chlorine or bromine; wherein R″ and R‴ are alkyl, defined as above, or together

are pyrrolidino, piperidino, and morpholino.

The new compounds II IIa, III, IV, and V which can be summarily, illustratively represented by the Formula VI:

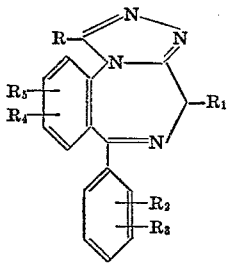

wherein R is selected from the group consisting of chlorine, bromine, cyano, OR′, in which R′ is an alkyl group of 1 to 3 carbon atoms, inclusive and

in which R″, and R‴ are alkyl defined as above, or together

are pyrrolidino, piperidino, and morpholino; wherein $R_1$ is selected from the group consisting of hydrogen and alkyl, as defined above; and wherein $R_2$, $R_3$, $R_4$, and $R_5$ are selected from the group consisting of hydrogen, alkyl as defined above, chloro, fluoro, bromo, nitro, cyano, trifluoromethyl, and alkoxy, alkylthio, alkylsulfinyl, and alkylsulfonyl, in which the carbon chain moieties are of 1 to 3 carbon atoms, inclusive. The process of this invention comprises:

(1) Heating at 40–76 C. a selected 6-phenyl-4H-s-triazolo[4,3-a][1,4]benzodiazepine (I) with a N-chloro- or N-bromosuccinimide in an inert, organic solvent, to give the corresponding 1-chloro- or 1-bromo-6-phenyl-4H-s-triazolo[4,3-a][1,4]benzodiazepine (II): (1) heating preferably IIa [the 1-substituent in IIa is bromo; but the chloro compound is also operable] in an inert, organic, high boiling solvent at 120–170° to obtain the corresponding 1-cyano - 6 - phenyl - 4H - s - triazolo[4,3-a]-[1,4]benzodiazepine III; or (2) heating IIa at 60–97° C. with a sodium or potassium lower alkoxide of formula R′O wherein R′ is alkyl of 1 to 3 carbon atoms, inclusive, in an excess of lower alkanol R′OH in which R′ is defined as above, to obtain the corresponding 1-alkoxy-6-phenyl-4H-s-triazolo[4,3-a][1,4]benzodiazepine (IV); or (3) heating IIa with a dialkylamine, pyrrolidine, piperidine, or morpholine, alkyl or one to three carbon atoms, inclusive, to give the corresponding 1-(substituted amino)-6-phenyl - 4H - s - triazolo[4,3-a][1,4]benzodiazepine V.

DESCRIPTION OF THE PREFERRED EMBODIMENT

Lower alkyl groups of 1 to 3 carbon atoms, inclusive, are exemplified by methyl, ethyl, propyl, and isopropyl. The carbon chain moiety of alkoxy, alkylthio, alkylsulfinyl, alkylsulfonyl, and dialkylamino is alkyl of 1 to 3 carbon atoms, inclusive, as above.

The novel compounds of the Formula VI including acid addition salts thereof have sedative, tranquilizing and muscle relaxant effect in mammals and birds.

The acid addition salts of compounds of Formula VI contemplated in this invention, are the hydrochlorides, hydrobromides, hydriodides, sulfates, phosphates, cyclohexanesulfamates, methanesulfonates, and the like, prepared by reacting a compound of Formula VI with an excess of the selected pharmacologically acceptable acid.

Sedative effects of 1,8-dichloro - 6 - phenyl-4H-s-triazolo[4,3-a][1,4]benzodiazepine are shown by the following tests in mice:

Chimney test.—[Med. Exp. 4, 11 (1961)]: The effective intraperitoneal dosage for 50% of mice ($ED_{50}$) is 1.6 mg./kg. The test determines the ability of mice to back up and out of a vertical glass cylinder within 30 seconds. At the effective dosage, 50% of the mice failed doing it.

Dish test.—Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 1.0 mg./kg.

Pedestal test.—The untreated mouse leaves the pedestal in less than a minute to climb back to the floor of the standard mouse box. Tranquilized mice will stay on the pedestal for more than 1 minute. The $ED_{50}$ (intraperitoneal administration) was 1.1 mg./kg.

Nicotine antagonism test.—Mice in a group of 6 are injected with the test compound (1,8-dichloro-6-phenyl-4H-s - triazolo[4,3-a][1,4]benzodiazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 0.71 mg./kg. of the test compound protected 50% of the mice against (2) and 0.8 mg./kg. against (3).

Antagonism to strychnine (as sulfate).—The effective dosage ($ED_{50}$) of 1,8-dichloro-6-phenyl-4H-s-triazolo [4,3-a][1,4]benzodiazepine is 7 mg./kg. orally in mice. The test consists in orally administering to groups of 6 mice the test compound, 1,8-dichloro-6-phenyl-4H-s-triazolo[4,3-a][1,4]benzodiazepine and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds have (by intraperitoneal injection) $ED_{50}$ as shown in the table below:

| Compound | $ED_{50}$ (in mg./kg.) | | | |
| --- | --- | --- | --- | --- |
| | Ch | D | P | Ni |
| 1-bromo-8-chloro-6-phenyl-4H-s-triazolo[4,3-a]-[1,4]benzodiazepine | 8 | 9 | 10 | 1.4 |
| 1-cyano-8-chloro-6-phenyl-4H-s-triazolo[4,3-a]-[1,4]benzodiazepine | 2.2 | 2.5 | 5.0 | 0.7 |
| 1-methoxy-8-chloro-6-phenyl-4H-s-triazolo[4,3-a]-[1,4]benzodiazepine | 0.1 | 0.08 | 0.18 | 0.045 |

NOTE.—Ch=chimney test, D=dish test, P=pedestal test, Ni=nicotine antagonism (3) test.

The pharmaceutical forms contemplated by this invention include pharmaceutical compositions suited for oral parenteral, and rectal use, e.g., tablets, powder packets, cachets, drageés, capsules, solutions, suspensions, sterile injectable forms, suppositories, bougies, and the like. Suitable diluents or carriers such as carbohydrates (lactose), proteins, lipids, calcium phosphate, corn starch, stearic acid, methylcellulose and the like may be used as carriers or for coating purpose. Oil, e.g., coconut oil, sesame oil, safflower oil, cotton seed oil, peanut oil may be used for preparing solutions or suspensions of the active drug. Sweetening, coloring and flavoring agents may be added.

For mammals and birds, food premixes with starch, oatmeal, dried fishmeat, fishmeal, flour and the like can be prepared.

As tranquilizer the compounds of Formula VI can be used in dosages of 0.1 to 25 mg./kg. in oral or injectable preparations as described above, to alleviate tension and anxiety in mammals, or birds, such as e.g., occurs when animals are in travel.

Other acid addition salts of the compounds of Formula VI can be made such as the fluosilicic acid addition salts which are useful mothproofing compounds or the trichloroacetates useful as herbicides against Johnson grass, Bermuda grass, yellow foxtail and green foxtail, and quack grass.

The starting materials of Formula I of this invention, are prepared as shown in Preparation 1.

In carrying out the process of this invention, a selected 6-phenyl - 4H - s-triazolo[4,3-a][1,4]benzodiazepine (I) is heated with a halogenating agent providing a chloro or bromo atom for the halogenation. Halogenating agents for this reaction are N-bromo- and N-chloroacetamide and preferably N-chloro- and N-bromo succinimide. The reaction is carried out in an inert organic solvent, e.g. methylene chloride, chloroform, carbon tetrachloride, ethylene dichloride and the like at a temperature of 40–76° C., preferably at the reflux temperature of the mixture for a period of 2 to 8 hours. The product, thus obtained, a 1-chloro- or 1-bromo-6-phenyl - 4H - s-triazolo-[4,3-a][1,4]-benzodiazepine, (II) is recovered and purified by conventional procedures, e.g. extraction, chromatography, crystallization and the like.

Compound IIa, 1-bromo - 6 - phenyl-4H-s-triazolo-[4,3-a][1,4]benzodiazepine i.e. a compound II in which the 1-position is substituted with bromine, is converted to 1-cyano - 6 - phenyl-4H-s-triazolo[4,3-a][1,4]benzodiazepine (III) by heating it with cuprous cyanide in a high-boiling organic solvent for 1 to 5 hours between 120–170° C. Solvents useful for this purpose are dimethylmethylacetamide, diethyl acetamide, xylenes, trimethylformamide, diethylformamide, dipropylformamide, dibenzenes and the like. After the reaction is terminated, the product III is isolated and purified by conventional procedures, i.e. extraction, chromatography, crystallization, and the like.

1-alkoxy-6-phenyl - 4H - s - triazolo[4,3-a][1,4]benzodiazepines (IV) are produced from Compounds IIa by heating a selected Compound IIa with an alkali metal salt of an alkanol in an excess of the lower alkanol conveniently at reflux or between 60–97° C. for fifteen minutes to 2 hours. Useful alkoxides of this type are sodium and potassium methoxide, ethoxide, propoxide isopropoxide with a solvent of the same type, i.e. methanol, ethanol, and 1- and 2-propanol. At the termination, the mixtures is preferably poured into excess water and extracted with a water-immiscible solvent. The extracted products are purified by conventional procedures e.g. chromatography and crystallizations.

Compounds of Formula IIa can be reacted with an amine of the formula

in which

is defined as above, to give the corresponding 1-amino-6-phenyl-4H-s-triazolo[4,3 - a][1,4]benzodiazepine V. This reaction is preferably carried out between 55–100° C. with or without a solvent. As solvent ethanol, propanol, dioxane, tetrahydrofuran, dibutyl ether, hexamethylphosphoric acid amide, or the like can be used or just an excess of amine. Diethylamine, dipropylamine, di-isopropylamine can be used in this manner. For dimethylamine a solvent is used or sealed tube techniques are necessary, due to its low boiling point. The time of reaction is 1–18 hours. An alkali metal salt of the amine e.g. sodium dimethylamide in a solvent can be used in this reaction. After termination of the reaction, the product V is isolated and purified by conventional procedures, i.e. extraction, chromatography, crystallization and the like.

The following preparations and examples are illustrative of the processes and products of the present invention, but are not to be construed as limiting.

PREPARATION 1

8-chloro-6-phenyl-4H-s-triazolo[4,3-a][1,4]-benzodiazepine

A solution of 5.74 g. (0.02 mole) of 1,3-dihydro-7-chloro-5-phenyl-2H-1,4-benzodiazepine-2-thione and 3.6 g. (0.6 mole) of formic acid hydrazide in 200 ml. of 1-butan-ol was heated under reflux for 3 hours 45 minutes with a slow stream of nitrogen passing through the reaction mixture to remove the hydrogen sulfide formed. The reaction mixture was concentrated, and the residue was suspended in water. The solid was collected by filtration, dissolved in methylene chloride and dried over anhydrous potassium carbonate. Removal of the solvent gave a residue which was recrystallized from ethyl acetate-Skelly-solve B hexanes to give 8-chloro-6-phenyl-4H-s-triazolo[4,3-a][1,4]benzodiazepine of melting point 228–229° C.

In the same manner given in Preparation 1 by heating other: 1,3-dihydro - 5 - phenyl-2H-1,4-benzodiazepine-2-thiones with formic acid hydrazide other 6-phenyl-4H-s-triazolo[4,3-a][1,4]benzodiazepines are produced. Representative compounds, thus produced, include:

8-chloro-6-(2,6-difluorophenyl)-4H-s-triazolo[4,3-a][1,4]benzodiazepine;
8-chloro-6-(o-chlorophenyl)-4H-s-triazolo[4,3-a][1,4]benzodiazepine;
8-nitro-6-(o-chlorophenyl)-4H-s-triazolo[4,3-a][1,4]benzodiazepine;
8-chloro-6-(o-fluorophenyl)-4H-s-triazolo[4,3-a][1,4]benzodiazepine;
6-(o-chlorophenyl)-4H-s-triazolo[4,3-a][1,4]benzodiazepine;
8-trifluoromethyl-6-phenyl-4H-s-triazolo[4,3-a][1,4]benzodiazepine;
8-nitro-6-phenyl-4H-s-triazolo[4,3-a][1,4]benzodiazepine;
10-ethyl-6-phenyl-4H-s-triazolo[4,3-a][1,4]benzodiazepine;
10-trifluoromethyl-6-[p-(dipropylamino)phenyl]-4H-s-triazolo[4,3-a][1,4]benzodiazepine;
7-ethylthio-6-(o-bromophenyl)-4H-s-triazolo[4,3-a][1,4]benzodiazepine;
9-cyano-6-[p-trifluoromethyl)phenyl]-4H-s-triazolo[4,3-a][1,4]benzodiazepine;
7,10-dichloro-6-(p-isopropylphenyl)-4H-s-triazolo[4,3-a][1,4]benzodiazepine;
4,7,9-trimethyl-6-(o-chlorophenyl)-4H-s-triazolo[4,3-a][1,4]benzodiazepine;
10-propylsulfonyl)-6-phenyl-4H-s-triazolo[4,3-a][1,4]benzodiazepine;
7-dimethylamino-8-fluoro-6-phenyl-4H-s-triazolo[4,3-a][1,4]benzodiazepine;
10-chloro-6-(m-isopropylphenyl)-4H-s-triazolo[4,3-a][1,4]benzodiazepine;
9-(dipropylamino)-6-[m-(dipropylamino)phenyl]-4H-s-triazolo[4,3-a][1,4]benzodiazepine;
8-(methylsulfinyl)-6-(o-nitrophenyl)-4H-s-triazolo[4,3-a][1,4]benzodiazepine;
7-(ethylsulfonyl)-6-(o-cyanophenyl)-4H-s-triazolo[4,3-a][1,4]benzodiazepine;

4-propyl-6-[m-(methylthio)phenyl]-4H-s-triazolo[4,3-a][1,4]benzodiazepine;

10-fluoro-7-chloro-6-[p-(trifluoromethyl)phenyl]-4H-s-triazolo[4,3-a][1,4]benzodiazepine;

7,9-diethoxy-6-(m-ethoxyphenyl)-4H-s-triazolo[4,3-a][1,4]benzodiazepine;

4-ethyl-6-[o-(ethylthio)phenyl]-4H-s-triazolo[4,3-a][1,4]benzodiazepine;

4-methyl-7,10-dichloro-6-(m-isopropoxyphenyl)-4H-s-triazolo[4,3-a][1,4]benzodiazepine;

9-(dipropylamino)-6-[m-(propylthio)phenyl]-4H-s-triazolo[4,3-a][1,4]benzodiazepine;

7-(diisopropylamino)-6-[p-(dipropylamino)phenyl]-4H-s-triazolo[4,3-a][1,4]benzodiazepine;

8-chloro-6-(3,4-dimethylphenyl)-4H-s-triazolo[4,3-a][1,4]benzodiazepine;

6-(2-methyl-4-methoxyphenyl)-4H-s-triazolo[4,3-a][1,4]benzodiazepine;

8-methylthio-6-phenyl-4H-s-triazolo[4,3-a][1,4]benzodiazepine;

8-methoxy-6-phenyl-4H-s-triazolo[4,3-a][1,4]benzodiazepine;

and the like.

EXAMPLE 1

1,8-dichloro-6-phenyl-4H-s-triazolo[4,3-a][1,4]benzodiazepine

A stirred mixture of 8-chloro-6-phenyl-4H-s-triazolo[4,3-a][1,4]benzodiazepine (2.95 g., 0.01 mole) N-chlorosuccinimide (1.48 g., 0.011 mole) and carbon tetrachloride (200 ml.) was refluxed under a nitrogen atmosphere for 7 hours and kept at ambient temperature for 16 hours. Water and enough chloroform to dissolve the precipitated product were added to the mixture and the layers were separated. The aqueous layer was extracted with chloroform and the combined organic solution was dried over anhydrous potassium carbonate and concentrated. The residue was chromatographed on silica gel (200 g.) with 1% methanol-99% chloroform. The product obtained from the column was crystallized from ethyl acetate to give: 1,8-dichloro-6-phenyl-4H-s-triazolo[4,3-a][1,4]benzodiazepine 0.57 g., of melting point 198–199° C. and 0.19 g. of melting point 197.5–198.5° C. The analytical sample had a melting point of 198–199° C.

*Analysis.*—Calcd. for $C_{16}H_{10}Cl_2N_4$ (percent): C, 58.38; H, 3.06; Cl, 21.54; N, 17.02. Found (percent): C, 58.72; H, 3.09; Cl, 21.70; N, 16.93.

EXAMPLE 2

1-bromo-8-chloro-6-phenyl-4H-s-triazolo[4,3-a][1,4]benzodiazepine

A stirred mixture of 8-chloro-6-phenyl-4H-s-triazolo[4,3-a][1,4]benzodiazepine (14.7 g., 0.05 mole), N-bromosuccinimide (8.9 g., 0.05 mole), and carbon tetrachloride (1 liter) was refluxed, under a nitrogen atmosphere for 4 hours, cooled and concentrated in vacuo. The residue was mixed with water and extracted with chloroform. The extract was dried over anhydrous potassium carbonate and concentrated. Crystallization of the residue from ethyl acetate gave 7.74 g. of 1-bromo-8-chloro-6-phenyl-4H-s-triazolo[4,3-a][1,4]benzodiazepine of melting point 202.5–206° C. The mother liquor was concentrated and chromatographed on silica gel (500 g.) with 2.5% methanol-97.5% chloroform. The product obtained from the column was recrystallized from ethyl acetate to give 3.01 g. of 1-bromo-8-chloro-6-phenyl-4H-s-triazolo[4,3-a][1,4]benzodiazepine of melting point 205–207°. The analytical sample had a melting point of 202–203.5° C.

*Analysis.*—Calcd. for $C_{16}H_{10}BrClN_4$ (percent): C, 51.43; H, 2.70; Br, 21.39; Cl, 9.49; N, 15.00. Found (percent): C, 51.32; H, 2.98; Br, 21.14; Cl, 9.59; N, 15.20.

EXAMPLE 3

1,8-dichloro-6-(o-chlorophenyl)-4H-s-triazolo[4,3-a][1,4]benzodiazepine

In the manner given in Example 1, 8-chloro-6-(o-chlorophenyl)-4H-s-triazolo[4,3-a][1,4]benzodiazepine was treated with N-chlorosuccinimide in chloroform to give 1,8-dichloro-6-(o-chlorophenyl)-4H-s-triazolo[4,3-a][1,4]benzodiazepine.

EXAMPLE 4

1,8-dichloro-6-(o-fluoropenyl)-4H-s-triazolo[4,3-a][1,4]benzodiazepine

In the manner given in Example 1, 8-chloro-6-(o-fluorophenyl)-4H-s-triazolo[4,3-a][1,4]benzodiazepine was treated with N-chlorosuccinimide in carbon tetrachloride to give 1,8-dichloro-6-(o-fluorophenyl)-4H-s-triazolo[4,3-a][1,4]benzodiazepine.

EXAMPLE 5

1-bromo-6-(o-chlorophenyl)-4H-s-triazolo[4,3-a][1,4]benzodiazepine

In the manner given in Example 2, 6-(o-chlorophenyl)-4H-s-triazolo[4,3-a][1,4]benzodiazepine was treated with N-bromosuccinimide in carbon tetrachloride to give 1-bromo-6-(o-chlorophenyl)-4H-s-triazolo[4,3-a][1,4]benzodiazepine.

EXAMPLE 6

1-bromo-8-chloro-6-(2,6-difluorophenyl)-4H-s-triazolo[4,3-a][1,4]benzodiazepine

In the manner given in Example 2, 8-chloro-6-(2,6-difluorophenyl)-4H-s-triazolo[4,3-a][1,4]benzodiazepine was treated with N-bromosuccinimide in chloroform to give 1-bromo-8-chloro-6-(2,6-difluorophenyl)-4H-s-triazolo[4,3-a][1,4]benzodiazepine.

EXAMPLE 7

7-trifluoromethyl-1,8-dibromo-6-(p-isopropyl)phenyl)-4H-s-triazolo[4,3-a][]1,4]benzodiazepine In the manner given in Example 2, 7-trifluoromethyl-8-bromo-6-(p-isopropylphenyl)-4H-s-triazolo[4,3-a][1,4]benzodiazepine was treated with N-bromosuccinimide in chloroform to give 7-trifluoromethyl-1,8-dibromo-6-(p-isopropylphenyl)-4H-s-triazolo[4,3-a][1,4]-benzodiazepine.

EXAMPLE 8

1-chloro-10-dipropylamino-4-methyl-6-(p-fluorophenyl)-4H-s-triazolo[4,3-a][1,4]benzodiazepine In the manner given in Example 1, 10-dipropylamino-4-methyl-6-(p-fluorophenyl)-4H-s-triazolo[4,3-a][1,4]benzodiazepine was treated with N-chlorosuccinimide in methylene chloride to give 1-chloro-10-dipropylamino-4-methyl-6-(p-fluorophenyl)-4H-s-triazolo[4,3-a][1,4]benzodiazepine.

EXAMPLE 9

1-bromo-8,9-dicyano-4-ethyl-6-(p-nitrophenyl)-4H-s-triazolo[4,3-a][1,4]benzodiazepine In the manner given in Example 2, 8,9-dicyano-4-ethyl-6-(p-nitrophenyl)-4H-s-triazolo[4,3-a][1,4-benzodiazepine was treated with N-bromoacetamide in carbontetrachloride to give 1-bromo-8,9-dicyano-4-ethyl-6-(p-nitrophenyl)-4H-s-triazolo[4,3-a][1,4]benzodiazepine.

EXAMPLE 10

1-bromo-9-ethylsulfinyl-8-fluoro-6-[m-(isopropylsulfonyl)phenyl]-4H-s-triazolo[4,3-a][1,4]benzodiazepine In the manner given in Example 2, 9-ethylsulfinyl-8-fluoro-6-[m-(isopropylsulfinyl)phenyl]-4H-s-triazolo[4,3-a][1,4]benzodiazepine was treated with N-bromosuccinimide in chloroform to give 1-bromo-9-ethylsulfinyl- 8 - fluoro-6-[m-(isopropylsulfonyl)phenyl]4H-s-triazolo-[4,3-a][1,4]benzodiazepine.

EXAMPLE 11

1-chloro-8-methylthio-7-nitro-6-(m-ethoxyphenyl)-4H-s-triazolo[4,3-a][1,4]benzodiazepine In the manner given in Example 1, 8-methylthio-7-nitro-6-(m-ethoxyphenyl) - 4H - s - triazolo[4,3-a][1,4]benzodiazepine was treated with N-chlorosuccinimide in carbon tetrachloride to give 1-chloro-8-methylthio-7-nitro-6-(m-ethoxyphenyl)-4H-s-triazolo[4,3 - a][1,4]benzoazepine.

EXAMPLE 12

1-bromo-10-ethylthio-6-(o-cyanophenyl)-4H-s-triazolo [4,3-a][1,4]benzodiazepine

In the manner given in Example 2, 10-ethylthio-6-(o-cyanophenyl)-4H-s-triazolo[4,3 - a][1,4]benzodiazepine was treated with N-bromosuccinimide in chloroform to give 1-bromo - 10 - ethylthio-6-(o-cyanophenyl)-4H-s-triazolo[4,3-a][1,4]benzodiazepine.

EXAMPLE 13

8-chloro-6-phenyl-4H-s-triazolo[4,3-a][1,4]benzodiazepine-1-carbonitrile

A mixture of 1-bromo-8-chloro-6-phenyl-4H-s-triazolo[4,3-a][1,4]benzodiazepine (7.48 g., 0.02 mole), cuprous cyanide (1.97 g., 0.022 mole) and dimethylformamide (50 ml.) was heated at 150° C., under a nitrogen atmosphere for 2 hours, cooled, poured into 25 ml. of 25% ethylenediamine and extracted with chloroform. The extract was washed successively with 25 ml. of 25% ethylenediamine, water and brine; dried over anhydrous potassium carbonate and concentrated. The residue was chromatographed on silica gel (500 g.) with 1% methanol-99% chloroform. The first material eluted from the column was the product which was crystallized from ethyl acetate-Skellysolve B hexanes to give 2.78 g. of 8-chloro-6 - phenyl-4H-s-triazolo[4,3 - a][1,4]benzodiazepine - 1-carbonitrile of melting point 193–194.5°. The analytical sample had a melting point of 194–195°.

*Analysis.*—Calcd. for $C_{17}H_{10}ClN_5$ (percent): C, 63.85; H, 3.15; Cl, 11.09; N, 21.90. Found (percent): C, 63.44; H, 3.08; Cl, 11.06; N, 21.70.

EXAMPLE 14

8-chloro-6-(o-chlorophenyl)-4H-s-triazolo[4,3-a][1,4] benzodiazepine-1-carbonitrile In the manner given in Example 13, 1-bromo-8-chloro-6-(o-chlorophenyl) - 4H - s - triazolo[4,3-a][1,4]benzodiazepine was heated with cuprous cyanide in dimethylformamide to give 8-chloro-6-(o-chlorophenyl)-4H-s-triazolo[4,3-a][1,4]benzodiazepine-1-carbonitrile.

EXAMPLE 15

8-chloro-6-(2,6-difluorophenyl)-4H-s-triazo[4,3-a][1,4]benzodiazepine-1-carbonitrile In the manner given in Example 13, 1-bromo-8-chloro-6 - (2,6 - difluorophenyl)-4H-s-triazolo[4,3-a][1,4]benzodiazepine was heated with cuprous cyanide in dimethylformamide to give 8-chloro-6-(2,6-difluorophenyl)-4H-s-triazolo[4,3-a][1,4]benzodiazepine-1-carbonitrile.

EXAMPLE 16

6-(o-chlorophenyl)-4H-s-triazolo[4,3-a][1,4]benzodiazepine-1-carbonitrile

In the manner given in Example 13, 1-bromo-6-(o-chlorophenyl)-4H-s-triazolo[4,3 - a][1,4]benzodiazepine was heated with cuprous cyanide in dimethylformamide to give 6 - (o - chlorophenyl)-4H-s-triazolo[4,3-a][1,4]benzodiazepine-1-carbonitrile.

EXAMPLE 17

7-trifluoromethyl-8-bromo - 6 - (p-isopropylphenyl)-4H-s-triazolo[4,3-a][1,4]benzodiazepine-1-carbonitrile In the manner given in Example 13, 1,8-dibromo-7-trifluoromethyl - 6 - (p-isopropylphenyl)-4H-s-triazolo[4,3-a][1,4]benzodiazepine was heated with cuprous cyanide in dimethylformamide to give 7-trifluoromethyl-8-bromo-6 - (p - isopropylphenyl)-4H-s-triazolo[4,3-a][1,4]benzodiazepine-1-carbonitrile.

EXAMPLE 18

8,9-dicyano - 4 - ethyl-6-(p-nitrophenyl)-4H-s-triazolo[4,3-a][1,4] benzodiazepine-1-carbonitrile In the manner given in Example 13, 1-bromo-8,9-dicyano - 4 - ethyl-6-(p-nitrophenyl)-4H-s-triazolo[4,3-a][1,4]-benzodiazepine was heated with cuprous cyanide in dimethylformamide to give 8,9-dicyano-4-ethyl-6-(p-nitrophenyl)-4H-s-triazolo[4,3-a][1,4]benzodiazepine-1-carbonitrile.

EXAMPLE 19

8-chloro-1-methoxy-6-phenyl-4H-s-triazolo[4,3-a][1,4]benzodiazepine

A mixture of 1-bromo-8-chloro-6-phenyl-4H-s-triazolo[4,3-a][1,4]benzodiazepine (0.374 g., 0.001 mole) was added to a solution of sodium (0.070 g.) in methanol (10 ml.); the mixture was refluxed under nitrogen for 45 minutes and poured into ice water. This mixture was extracted with methylene chloride. The extract was dried over anhydrous potassium carbonate and concentrated. The thus-obtained residue was crystallized from ethyl acetate-Skellysolve B hexanes to give 0.21 g. of 8-chloro-1-methoxy-6-phenyl-4H-s-triazolo[4,3 - a][1,4]benzodiazepine of melting point 162–163° C. The analytical sample had a melting point of 163–164° C.

*Analysis.*—Calcd. for $C_1H_{13}ClN_4O$ (percent): C, 62.87; H, 4.03; Cl, 10.92; N, 17.25. Found (percent): C, 62.63; H, 4.17; Cl, 10.93; N, 16.96.

EXAMPLE 20

8-chloro-1-ethoxy-6-(o-chlorophenyl)-4H-s-triazolo [4,3-a][1,4]benzodiazepine

In the manner given in Example 19, 1-bromo-8-chloro-6 - (o - chlorophenyl)-4H-s-triazolo[4,3-a][1,4]benzodiazepine was refluxed with sodium ethoxide in ethanol to give 8 - chloro-1-ethoxy-6-(o-chlorophenyl)-4H-s-triazolo [4,3-a][1,4]benzodiazepine.

EXAMPLE 21

8-chloro-1-propoxy-6-(2,6-difluorophenyl)-4H-s-triazolo [4,3-a][1,4]benzodiazepine In the manner given in Example 19, 1,8-dichloro-6-(2, 6 - difluorophenyl)-4H-s-triazolo[4,3 - a][1,4]benzodiazepine was refluxed with sodium propoxide in 1-propanol to give 8 - chloro-1-propoxy-6-(2,6-difluorophenyl)-4H-s-triazolo[4,3-a][1,4]benzodiazepine.

EXAMPLE 22

1-methoxy-8-nitro-6-(o-chlorophenyl)-4H-s-triazolo [4,3-a][1,4]benzodiazepine

In the manner given in Example 19, 1-bromo-8-nitro-6-(o-chlorophenyl) - 4H - s - triazolo[4,3-a][1,4]benzodiazepine was refluxed with sodium methoxide in methanol to give 1-methoxy - 8 - nitro-6-(o-chlorophenyl)-4H-s-triazolo[4,3-a][1,4]benzodiazepine.

EXAMPLE 23

1-isopropoxy-6-(o-chlorophenyl)-4H-s-triazolo [4,3-a][1,4]benzodiazepine

In the manner given in Example 19, 1-bromo-6-(o-chlorophenyl) - 4H-s-triazolo[4,3-a][1,4]benzodiazepine was refluxed with sodium isopropoxide in 2-propanol to give 1 - isopropoxy-6-(o-chlorophenyl)-4H-s-triazolo[4,3-a][1,4]benzodiazepine.

EXAMPLE 24

7-trifluoromethyl-8-bromo - 1 - methoxy-6-(p-isopropylphenyl(-4H-s-triazolo[4,3-a][1,4]benzodiazepine In the manner given in Example 19, 1,8-dibromo-7-trifluoromethyl-6-(p - isopropylphenyl)-4H-s-triazolo[4,3-a][1,4]benzodiazepine was refluxed with sodium methoxide in methanol to give 7-trifluoromethyl-8-bromo-1-methoxy-6 - (p-isopropylphenyl)-4H-s-triazolo[4,3 - a][1,4]benzodiazepine.

EXAMPLE 25

8,9-dicyano-4-ethyl-1-ethoxy-6-(p-nitrophenyl)-4H-s-triazolo[4,3-a][1,4]benzodiazepine In the manner given in Example 19, 1-bromo-8,9-dicyano - 4 - ethyl-6-(p-nitrophenyl)-4H-s-triazolo[4,3-a][1,4]benzodiazepine was refluxed with sodium ethoxide in ethanol to give 8,9-dicyano-4-ethyl-1-ethoxy-6-(p-nitrophenyl)-4H-s-triazolo[4,3-a][1,4]benzodiazepine.

EXAMPLE 26

8-chloro-1-diethylamino-6-phenyl-4H-s-triazolo[4,3-a][1,4]benzodiazepine

A mixture of 1-bromo-8-chloro-6-phenyl-4H-s-triazolo[4,3-a][1,4]benzodiazepine (7.48 g., 0.02 mole) and diethyl amine (4.5 g., 0.1 mole) with 50 ml. dimethylformamide were heated to 80° C. for 8 hours. The mixture was allowed to cool, then poured into 200 ml. of cold water and extracted with three 100-ml. portions of chloroform. The extracts were combined, dried over anhydrous potassium carbonate, and evaporated. The thus obtained residue was crystallized from ethyl acetate-Skellysolve B hexanes to give pure 8-chloro-1-diethylamino-6-phenyl-4H-s-triazolo[4,3-a][1,4]benzodiazepine.

EXAMPLE 27

8-chloro-1-dipropylamino-6-(o-chlorophenyl)-4H-s-triazolo[4,3-a][1,4]benzodiazepine 1 - bromo - 8-chloro-6-(o-chlorophenyl)-4H-s-triazolo[4,3-a][1,4]benzodiazepine (0.002 mole) was added to a solution of 0.05 mole of dipropylamine and 0.03 mole of butyl lithium in hexamethyl phosphoric acid triamide PO[N(CH$_3$)$_2$]$_3$ (75 ml.) and the mixture was kept at 60° C. for 15 hours. The mixture was then poured into water and extracted with chloroform. The extracts were dried over potassium carbonate, evaporated to dryness and the resulting residue recrystallized from ethyl acetate-Skellysolve B hexanes to give 8-chloro-1-dipropylamino-6 - (o - chlorophenyl) - 4H-s-triazolo[4,3-a][1,4]benzodiazepine.

EXAMPLE 28

8-chloro-1-diisopropylamino-6-(2,6-difluorophenyl)-4H-s-triazolo[4,3-a][1,4]benzodiazepine In the manner given in Example 27, 1,8-dichloro-6-(2,6-difluorophenyl)-4H-s-triazolo[4,3-a][1,4]benzodiazepine, diisopropylamine and butyl lithium were heated in hexamethylphosphoric acid triamide to give 8-chloro-1-diisopropylamino - 6-(2,6-difluorophenyl)-4H-s-triazolo[4,3-a][1,4]benzodiazepine.

EXAMPLE 29

8-chloro-1-diethylamino-6-(o-fluorophenyl)-4H-s-triazolo[4,3-a][1,4]benzodiazepine In the manner given in Example 27, 1,8-dichloro-6-(o-fluorophenyl) - 4H-s-triazolo[4,3-a][1,4]benzodiazepine, diethylamine and butyl lithium were heated in hexamethylphosphoric acid triamide to give 8-chloro-1-diethylamino - 6 - (o-fluorophenyl) - 4H-s-triazolo[4,3-a][1,4]benzodiazepine.

EXAMPLE 30

7-trifluoromethyl-8-bromo-1-diethylamino-6-(p-isopropylphenyl)-4H-s-triazolo[4,3-a][1,4]benzodiazepine In the manner given in Example 27, 7-trifluoromethyl-1,8 - dibromo-6-(p-isopropylphenyl)-4H-s-triazolo[4,3-a][1,4]benzodiazepine, diethylamine, and butyl lithium were heated in hexamethylphosphoric acid triamide to give 7-trifluoromethyl - 8-bromo-1-diethylamino-6-(p-isopropylphenyl)-4H-s-triazolo[4,3-a][1,4]benzodiazepine.

EXAMPLE 31

8,9-dicyano-1-dipropylamino-4-ethyl-6-(p-nitrophenyl)-4H-s-triazolo[4,3-a][1,4]benzodiazepine In the manner given in Example 27, 1-bromo-8,9-dicyano-4-ethyl - 6 - (p-nitrophenyl)-4H-s-triazolo[4,3-a][1,4]benzodiazepine, dipropylamine and butyl lithium were heated in hexamethylphosphoric acid triamide to give 8,9 - dicyano - 1 - dipropylamino-4-ethyl-6-(p-nitrophenyl)-4H-s-triazolo[4,3-a][1,4]benzodiazepine.

EXAMPLE 32

8-chloro-1-dimethylamino-6-phenyl-4H-s-triazolo[4,3-a][1,4]benzodiazepine

8 - chloro - 1 - bromo - 6-phenyl-4H-s-triazolo[4,3-a][1,4]benzodiazepine was dispersed in dimethylformamide saturated with dimethylamine. The mixture was introduced into a heavy gauge tube, the tube sealed and heated for 14 hours at 65° C. After cooling, the tube was opened, the reaction mass was poured into water and the mixture extracted with chloroform. The chloroform extract was dried over anhydrous magnesium sulfate, evaporated and the resulting residue recrystallized from ethyl acetate to give pure 8 - chloro-1-dimethylamino-6-phenyl-4H-s-triazolo[4,3-a][1,4]benzodiazepine.

EXAMPLE 33

8-chloro-6-phenyl-1-pyrrolidino-4H-s-triazolo[4,3-a][1,4]benzodiazepine

A stirred mixture of 1 - bromo - 8 - chloro - 6 - phenyl-4H-s-triazolo[4,3-a][1,4]benzodiazepine (0.374 g.=0.001 mole in 2.5 ml. of pyrrolidine was refluxed for 5 hours under nitrogen. The resulting solution was allowed to remain for 18 hours at room temperature and then poured into ice water. The resulting solids were collected by filtration, washed with water and dried in vacuo to give 0.277 g. of crude product. This product combined with an extract (chloroform) obtained from extracting the filtrate was suspended in dilute base and then extracted with methylene chloride. This extract was washed with aqueous brine, dried over anhydrous potassium carbonate and concentrated in vacuo to give a residue. This residue was redissolved in toluene and again concentrated in vacuo to give a residue which was crystallized from methanol-methylene chloride to give 0.051 g. of a by-product.

The mother liquor was concentrated, the resulting residue was redissolved and decolorized with activated charcoal (Darco Co–60) concentrated again and the residue therefrom recrystallized from ethyl acetate-Skellysolve B hexanes to give 0.1629 g. of 8-chloro-6-phenyl-1-pyrrolidino-4H-s-triazolo[4,3-a][1,4]benzodiazepine of melting point 184.5–185.5° C.

Analysis.—Calcd. $C_{20}H_{18}ClN_5$ (percent): C, 66.02; H, 4.99; N, 19.25; Cl, 4.75. Found (percent): C, 65.46; H, 4.95; N, 19.31; Cl, 9.68.

Using in Example 33 piperidine or morpholine instead of pyrrolidine gives 8-chloro-6-phenyl-1-piperidino-4H-s-triazolo[4,3-a][1,4]benzodiazepine and respectively 8-chloro - 6 - phenyl - 1 - morpholino - 4H-s-triazolo[4,3-a][1,4]benzodiazepine.

In the manner given in the preceding examples, other 1 - substituted - 6 - phenyl - 4H - s - triazolo[4,3-a][1,4]

benzodiazepines of Formula VI can be prepared. Representative compounds, thus prepared, include:

9-(diproylamino)-1-chloro-6-[p-(dipropylamino)phenyl]-4H-s-triazolo[4,3-a][1,4]benzodiazepine;
8-(methylsulfinyl)-1-bromo-6-(o-nitrophenyl)-4H-s-triazolo[4,3-a][1,4]benzodiazepine;
7-(ethylsulfonyl)-6-(o-cyanophenyl)-4H-s-triazolo[4,3-a][1,4]benzodiazepine-1-carbonitrile;
4-propyl-1-methoxy-6-[m-(methylthio)phenyl]-4H-s-triazolo[4,3-a][1,4]benzodiazepine;
10-fluoro-7-chloro-1-diethylamino-6-[p-(trifluoromethyl)phenyl]-4H-s-triazolo[4,3-a][1,4]benzodiazepine;
7,9-diethoxy-1-bromo-6-(m-ethoxyphenyl)-4H-s-triazolo[4,3-a][1,4]benzodiazepine;
4-ethyl-1-methoxy-6-[o-(ethylthio)phenyl]-4H-s-triazolo[4,3-a][1,4]benzodiazepine;
4-methyl-7,10-dichloro-1-ethoxy-6-(m-isopropoxyphenyl)-4H-s-triazolo[4,3-a][1,4]benzodiazepine;
9-(dipropylamino)-1-chloro-6-[m-(propylthio)phenyl]-4H-s-triazolo[4,3-a][1,4]benzodiazepine;
7-(diisopropylamino)-1-bromo-6-[p-(dipropylamino)phenyl]-4H-s-triazolo[4,3-a][1,4]benzodiazepine;
4-isopropyl-7,9-difluoro-1-morpholino-6-phenyl-4H-s-triazolo[4,3-a][1,4]benzodiazepine;
8-chloro-1-piperidino-6-(3,4-dimethylphenyl-4H-s-triazolo[4,3-a][1,4]benzodiazepine;
6-(2-methyl-4-methoxyphenyl)-4H-s-triazolo[4,3-a][1,4]benzodiazepine-1-carbonitrile;
8-methylthio-1-methoxy-6-phenyl-4H-s-triazolo[4,3-a][1,4]benzodiazepine;
8-methoxy-1-ethoxy-6-phenyl-4H-s-triazolo[4,3-a][1,4]benzodiazepine;
1,10-dichloro-6-(m-isopropylphenyl)-4H-s-triazolo[4,3-a][1,4]benzodiazepine;
9-(dipropylamino)-1-bromo-6-[p-(dipropylamino)phenyl]-4H-s-triazolo[4,3-a][1,4]benzodiazepine;
8-methylsulfinyl-1-bromo-6-(o-nitrophenyl)-4H-s-triazolo[4,3-a][1,4]benzodiazepine;
7-(ethylsulfonyl)-1-propyloxy-6-(o-cyanophenyl)-4H-s-triazolo[4,3-a][1,4]benzodiazepine;
4-propyl-1-isopropyloxy-6-[m-(methylthio)phenyl]-4H-s-triazolo[4,3-a][1,4]benzodiazepine;
10-fluoro-7-chloro-1-ethoxy-6-[p-(trifluoromethyl)phenyl]-4H-s-triazolo[4,3-a][1,4]benzodiazepine;
7,9-diethoxy-6-(m-ethoxyphenyl)-4H-s-triazolo[4,3-a][1,4]benzodiazepine-1-carbonitrile;
7-(propylthio)-6-(m-iodophenyl)-4H-s-triazolo[4,3-a][1,4]benzodiazepine-1-carbonitrile;
1-chloro-4-ethyl-6-[o-(ethylthio)phenyl]-4H-s-triazolo[4,3-a][1,4]benzodiazepine;
7,10-dichloro-1-ethoxy-4-methyl-6-(m-isopropoxyphenyl)-4H-s-triazolo[4,3-a][1,4benzodiazepine;
9-(dipropylamino)-1-propoxy-6-[m-(propylthio)phenyl]-4H-s-triazolo[4,3-a][1,4]benzodiazepine;
7-(diisopropylamino)-1-chloro-6-[p-(dipropylamino)phenyl)-4H-s-triazolo[4,3-a][1,4]benzodiazepine;
8-chloro-6-(3,4-dimethylphenyl)-4H-s-triazolo[4,3-a][1,4]benzodiazepine-1-carbonitrile;
6-(2-methyl-4-methoxyphenyl)-4H-s-triazolo[4,3-a][1,4]benzodiazepine-1-carbonitrile;
8-methylthio-1-bromo-6-phenyl-4H-s-triazolo[4,3-a][1,4]benzodiazepine;
8-methoxy-1-chloro-6-phenyl-4H-s-triazolo[4,3-a][1,4]benzodiazepine;
8-chloro-1-pyrrolidino-6-(o-chlorophenyl)-4H-s-triazolo[4,3-a][1,4]benzodiazepine;
8-chloro-1-morpholino-6-(o-nitrophenyl)-4H-s-triazolo[4,3-a][1,4]benzodiazepine;
8-chloro-1-piperidino-6-(2,6-difluorophenyl)-4H-s-triazolo[4,3-a][1,4]benzodiazepine;
and the like.

What is claimed is
1. A compound of the formula

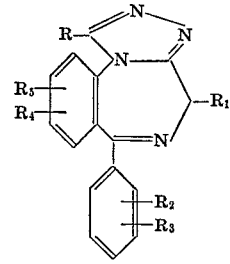

wherein R is selected from the group consisting of chlorine, bromine, cyano, OR′ in which R′ is an alkyl group of 1 to 3 carbon atoms, inclusive, and

in which R″ and R‴ are alkyl groups, defined as above, or together

represent pyrrolidino, piperidino, and morpholino; wherein $R_1$ is selected from the group consisting of hydrogen and alkyl, as defined above; and wherein $R_2$ $R_3$, $R_4$, and $R_5$ are selected from the group consisting of hydrogen, and alkyl, as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive, 2. A compound according to claim 1 of the formula:

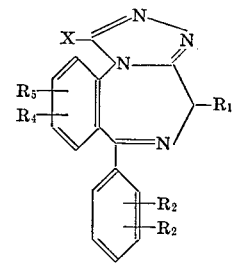

II wherein R is X in which X is chlorine or bromine; wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive.

3. The compound of claim 2 wherein X is bromine, $R_1$, $R_2$, $R_3$, and $R_5$ are hydrogen, $R_4$ is 8-chloro, and the compound is therefore 1-bromo-8-chloro-6-phenyl-4H-s-triazolo[4,3-a][1,4]benzodiazepine.

4. The compound of claim 2 wherein X is chlorine, $R_1$, $R_2$, $R_3$, and $R_5$ are hydrogen, $R_4$ is 8-chloro and the compound is therefore 1,8-dichloro-6-phenyl-4H-s-triazolo[4,3-a][1,4]benzodiazepine.

5. A compound according to claim 1 wherein R is cyano.

6. The compound according to claim 1 wherein R is cyano, $R_1$, $R_2$, $R_3$, and $R_5$ are hydrogen, $R_4$ is 8-chloro and the compound is therefore 1-cyano-8-chloro-6-phenyl-4H-s-triazolo[4,3-a][1,4-]benzodiazepine.

7. A compound according to claim 1 wherein R is OR′ in which R′ is an alkyl of 1 to 3 carbon atoms, inclusive.

8. The compound according to claim 1 wherein R is OR′ in which R′ is methyl, $R_1$, $R_2$, $R_3$, and $R_5$ are hydrogen, $R_4$ is 8-chloro and the compound is therefore 1-methoxy- 8-chloro-6-phenyl-4H-s-triazolo[4,3-a][1,4]benzodiazepine.

9. The compound according to claim 1 wherein R is OR' in which R' is ethyl, $R_1$, $R_2$, $R_3$, and $R_5$ are hydrogen, $R_4$ is 8-chloro and the compound is therefore 1-ethoxy-8-chloro-6-phenyl-4H-s-triazolo[4,3-a][1,4]benzodiazepine.

10. A compound according to claim 1, wherein R is

in which R' and R" are alkyl of 1 to 3 carbon atoms, inclusive.

11. The compound according to claim 1 wherein R is

in which R' and R" are methyl $R_1$, $R_2$, $R_3$, and $R_5$ are hydrogen, $R_4$ is 8-chloro and the compound is therefore 1-dimethylamino-8-chloro-6-phenyl-4H-s-triazolo[4,3-a][1,4]benzodiazepine.

12. The compound according to claim 1 wherein R is

in which R" and R'" are ethyl, wherein $R_1$, $R_2$, $R_3$, and $R_5$ are hydrogen, $R_4$ is 8-chloro and the compound is therefore 1-diethylamino-8-chloro-6-phenyl-4H-s-triazolo[4,3-a][1,4]benzodiazepine.

13. The compound according to claim 1 wherein R is pyrrolidino; wherein $R_1$, $R_2$, $R_3$ and $R_5$ are hydrogen, $R_4$ is 8-chloro and the compound is therefore 1-pyrrolidino-8-chloro-6-phenyl-4H-s-triazolo[4,3-a][1,4]benzodiazepine.

14. A process for the production of a compound of Formula II:

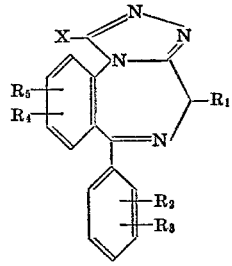

wherein X is chlorine or bromine; where $R_1$ is selected from the group consisting of hydrogen and alkyl of 1 to 3 carbon atoms, inclusive; and wherein $R_2$, $R_3$, $R_4$ and $R_5$ are selected from the group consisting of hydrogen, alkyl as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive, which comprises: Heating between 40–76° C. a 6-phenyl-4H-s-triazolo[4,3-a][1,4]benzodiazepine (I)

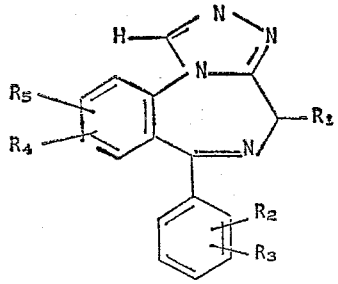

wherein $R_1$, $R_2$, $R_3$, $R_4$ and $R_5$ are defined as above, with a N-chloro- or N-bromosuccinimide in an inert, organic solvent, to give the corresponding 1-chloro- or 1-bromo-6-phenyl-4H-s-triazolo[4,3-a][1,4]benzodiazepine (II); above.

15. A process for the production of a compound of Formula III

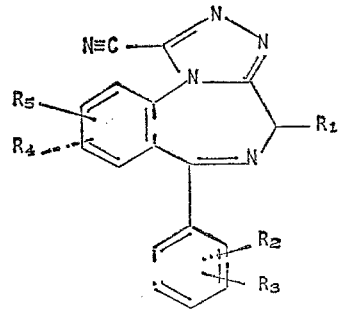

which comprises: heating between 40–76° C. a 6-phenyl-4H-s-triazolo[4,3-a][1,4]benzodiazepine (I)

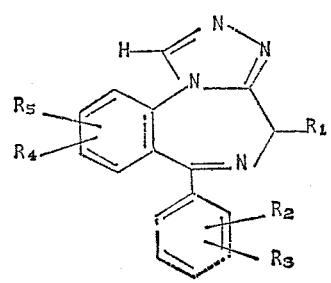

wherein $R_1$, $R_2$, $R_3$, $R_4$, and $R_5$ are selected from the group consisting of hydrogen, alkyl as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive, with a N-bromosuccinimide in an inert, organic solvent, to give the corresponding 1-bromo-6-phenyl-4H-s-triazolo[4,3-a][1,4]benzodiazepine (IIa); and heating IIa with cuprous cyanide in an inert, organic, high boiling solvent to 120–170° to obtain the corresponding 1-cyano-6-phenyl-4H-s-triazolo[4,3-a][1,4]benzodiazepine (III) of above.

16. A process for the production of a compound of Formula IV:

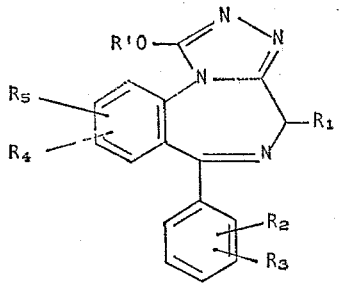

wherein R' is alkyl of 1 to 3 carbon atoms, inclusive, wherein $R_1$ is selected from the group consisting of hydrogen and alkyl, as defined above; and wherein $R_2$, $R_3$, $R_4$, and $R_5$ are selected from the group consisting of hydrogen, alkyl as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive, which comprises: heating at 40–76° C. a 6-phenyl-4H-s-triazolo[4,3-a][1,4]benzodiazepine (I)

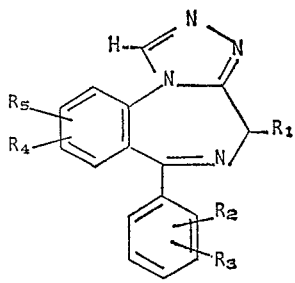

wherein $R_1$, $R_2$, $R_3$, $R_4$, and $R_5$ are defined as above, with a N-chloro- or N-bromosuccinimide in an inert, organic solvent, to give the corresponding 1-chloro- or 1-bromo-6-phenyl-4H-s-triazolo[4(3-a][1,4]benzodiazepine (II); and heating II at 60–97° C. with sodium or potassium lower alkoxide, in which the alkoxy group has the formula R'O in which R' is alkyl of 1 to 3 carbon atoms, inclusive, in an excess of a lower alkanol R'OH in which R' is defined as above, to obtain the corresponding 1-alkoxy-6-phenyl-4H-s-triazolo[4,3-a][1,4]benzodiazepine (IV), as above.

17. A process for the production of a compound of the Formula V

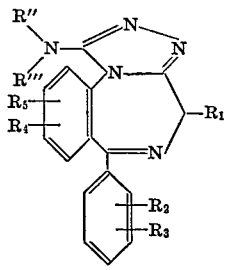

V wherein R'' and R''' are alkyl of 1 to 3 carbon atoms, inclusive, or together

represents pyrrolidino, piperidino, and morpholino; wherein $R_1$ is selected from the group consisting of hydrogen and alkyl, as defined above; and wherein $R_2$, $R_3$, $R_4$, and $R_5$ are selected from the group consisting of hydrogen, alkyl as defined above, fluoro, chloro, bromo, nitro, cyano, trifluoromethyl, and alkoxy, alkylthio, alkylsulfinyl, and alkylsulfonyl, in which the carbon chain moieties are of 1 to 3 carbon atoms, inclusive, which comprises: heating at 40–76° C. a 6-phenyl-4H-s-triazolo[4,3-a][1,4]benzodiazepine (I):

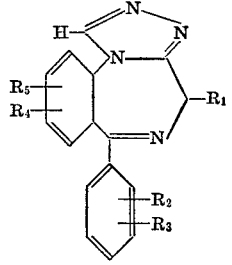

I wherein $R_1$, $R_2$, $R_3$, $R_4$, and $R_5$ are defined as above, with a N-chloro- or N-bromosuccinimide in an inert, organic solvent, to give the corresponding 1-chloro- or 1-bromo-6-phenyl-4H - s - triazolo[4,3-a][1,4]benzodiazepine (II), and heating II to 60–100° C. with a dialkylamine of the formula

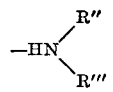

in which R'' and R''' are alkyl of one to three carbon atoms, inclusive, or together

represents pyrrolidino, piperidino, and morpholino; to give the corresponding 1-(substituted amino)-6-phenyl-4H-s-triazolo[4,3-a][1,4]benzodiazepine V above.

18. The process of claim 17 wherein the compound of Formula II is reacted with dialkylamine in the presence of a solvent selected from the group consisting of methanol, ethanol, dimethylformamide, dioxane, and hexamethylphosphoric acid triamide.

19. The process of claim 18 in which the solvent is hexamethylphosphoric acid triamide to which is added butyl lithium.

References Cited

UNITED STATES PATENTS 3,646,055   2/1972   Hester _____ 260—308 C

FOREIGN PATENTS 6,916,543   5/1970   Netherlands _____ 260—308 R
2,012,190   9/1970   Germany _____ 260—308 R ALTON D. ROLLINS, Primary Examiner U.S. Cl. X.R.

26—239.3 D, 293.59, 247.1, 247.5 B; 424—184, 248, 267, 269